United States Patent [19] [11] 4,126,291
Gilbert et al. [45] Nov. 21, 1978

[54] INJECTION MOLD FOR ELONGATED, HOLLOW ARTICLES

[75] Inventors: Russell T. Gilbert, Newport Beach; Irwin B. Pfau, Fountain Valley, both of Calif.

[73] Assignee: California Injection Molding Co., Inc., Costa Mesa, Calif.

[21] Appl. No.: 515,818

[22] Filed: Oct. 18, 1974

[51] Int. Cl.² .................................................. B29D 23/02
[52] U.S. Cl. ........................................ 249/63; 249/135; 249/141; 425/438; 425/556; 425/577; 425/812
[58] Field of Search ................ 425/249, 250, 251, 252, 425/134, 812, 542, 556, 577, 438; 249/122, 135, 105, 176–177, 141, 63; 264/327, 328

[56] References Cited
U.S. PATENT DOCUMENTS

| 1,887,729 | 11/1932 | Marvin | 249/135 |
| 2,115,590 | 4/1938 | Ryder | 425/249 |
| 2,339,443 | 1/1944 | Wilson | 425/249 |
| 2,799,435 | 7/1957 | Abplanalp | 264/328 |
| 2,976,571 | 3/1961 | Moslo | 249/141 |
| 3,266,098 | 8/1966 | Bucy | 425/812 |
| 3,719,396 | 3/1973 | Van de Walker et al. | 198/24 |
| 3,752,434 | 8/1973 | Herter | 425/249 |

FOREIGN PATENT DOCUMENTS

| 1,394,552 | 5/1964 | France | 249/141 |
| 1,055,226 | 9/1956 | Fed. Rep. of Germany | 425/812 |
| 1,200,518 | 9/1965 | Fed. Rep. of Germany | 425/812 |

Primary Examiner—Francis S. Husar
Assistant Examiner—John McQuade
Attorney, Agent, or Firm—Gausewitz, Carr & Rothenberg

[57] ABSTRACT

Thermometer probe covers having an extremely thin wall integral tip for enhanced heat transfer are injection molded by unique mold core construction and venting configuration. A tungsten carbide core minimizes core deflection to maintain improved concentricity of core and cavity. Maintainance of concentricity in quantity production apparatus is improved by a combination of relatively loose cantilevered mounting of an end of the core together with a press fit locking of the core upon closing of the mold. Venting of cavity gas during injection of mold material is precisely controlled through symmetrically distributed vent orifices in both the core and the female mold part. Core venting is controlled by a plurality of orifices and a manifold provided by a water cooled core vent pin within a bore of the core.

14 Claims, 16 Drawing Figures

INJECTION MOLD FOR ELONGATED, HOLLOW ARTICLES

BACKGROUND OF THE INVENTION

This invention relates to injection molding and more particularly concerns molding of elongated articles at least portions of which have extremely thin walls.

Various types of elongated thin wall molded plastic articles are presently manfuactured and used for many different purposes. Such articles include parts for ball point pens and various probe cover devices or sheaths. The widely employed electronic digital thermometer embodies a probe for insertion into a body cavity where temperature is to be measured. Removable probe covers or sheaths, either disposable or sterilizable, are provided for ready attachment to and detachment from the thermometer probe. Particularly for disposable devices, it is important to maintain a low cost. Nevertheless, because of limitations on molding techniques of the prior art, most elongated thin wall articles, such as thermometer probe covers, have been made in two parts. A first part is a relatively thick wall strong body portion. A second part comprises a thin wall tip that is required to afford rapid heat transfer from the exterior of the sheath to the interior of the sheath where the probe sensing element is positioned. Examples of such two-part probe covers are found in the U.S. Pat. Nos. to Mack et al, 2,983,385; Ensign et al, 3,349,896; 3,500,280 and 3,367,186; Keller, 3,469,449; and Oudewaal, 3,822,593.

A widely employed thermometer cover having a metal tip formed together with the molded plastic body is manufactured by the assignee of the present invention and described in the U.S. Pat. No. 3,719,396 to Van DeWalker et al. Two-part articles are more expensive.

Although the patent to Mueller et al, U.S. Pat. No. 3,729,998 suggests a sheath with a thin wall tip, there is no apparatus or method known in the prior art that can form such molded covers with tip walls sufficiently thin for a suitably high rate of heat transfer.

Despite the economic advantage derived from an integrally molded cover having a properly thin wall tip, prior art molding techniques are incapable of solving the many problems required of this type of fabrication. A typical thermometer cover has a length of about four inches, an average maximum diameter of considerably less than ½ inch and a wall having a thickness measured in thousandths of an inch. For commonly used injection molding materials such as polyethelene, for example, heat characteristics that are required to obtain an acceptably short response time dictate a wall thickness at the temperature sensing tip of about 0.020 inches. A preferable wall thickness of the tip is 0.010 inches.

Two major problems have prevented adequate solution of this thin wall molding problem in the past. These two problems are (a) maintaining proper relative position of a long, thin cantilevered core within a mold cavity and (b) the attendant problem of adequately and uniformly venting cavity gases during injection.

In this type of manufacture, material at a temperature of approximately 485° is injected under pressures of many tons, typical injection pressure being significantly greater than ten thousand pounds per square inch. Any slight departure from a circumferentially balanced condition of flow and pressure of the entering injected material will exert lateral forces on the long, slim cantilevered core. These lateral forces cause the core to bend to an extent that makes the wall of the article unacceptably thin, or to an extent where the core contacts the side of the cavity and thus leaves a hole in the finished article.

Recognizing this problem in the molding of articles (even articles with thicker walls) the patent to Stillman U.S. Pat. No. 2,876,495 suggests a unique solution. For the molding of an article having a wall thickness as great as 0.060 inches, this patentee finds it necessary to employ a complex moving support to avoid the deflection due to lateral forces of fluid pressure exerted during injection. The patentee uses a sliding ring that supports the core from the mold cavity. The ring slides along the core and cavity under pressure of the entering injected fluid. The patent to Schultz U.S. Pat. No. 2,434,594 provides a similar sliding sleeve or ring to prevent deflection of the core and hold it concentric with the die cavity as the injected molding material fills the cavity. The ring is finally pushed off the core and into a recess surrounding the die member as the injection is completed. The arrangements of the patents to Stillman and Schultz are complex and bulky, and are subject to significant amounts of down time due to frequent mechanical breakdown of the slidable and moving parts. Further, the slidable member causes wear on the mold parts, thus changing part dimensions, venting may be uneven and not properly controlled and witness lines or undesirable flashing may occur.

In thermometer covers, where the article is to be inserted into a body cavity, it is essential that there be no roughness, unevenness or other irregularity on the outer surface of the article and especially upon its tip. It is partly for this reason, that injection must occur at a point remote from the tip and that the core must be cantilevered, being entirely free at its tip to provide optimum smoothness at this portion of the finished article. Since many thermometer probes and accordingly, the probe covers or sheaths, are tapered or of varying cross section, the slidable ring or sleeve concept of the Shultz and Stillman patents cannot be employed, because these are useful only for articles of constant cross sectional configuration and dimension.

The significance of the problem of bending of a cantilevered core may be understood when it is noted that for an article having a wall thickness of 0.010 inches, deflection of the core tip of no more than 0.005 inches can be tolerated. This is so because the plastic cannot be forced to flow through a cavity space of less than 0.005 inches. Accordingly, if the core tip should deflect more than 0.005 inches in an arrangement for making articles having a nominal wall thickness of 0.010 inches, the article tip cannot be formed because no plastic can reach this area. Nevertheless, a typical steel core precisely positioned and aligned to be concentric with a cavity may deflect as much as 0.004 inches under forces exerted during conventional injection. This leaves the impossible tolerance of 0.001 inches for the total of all other factors that contribute to concentricity errors. Such other factors, in addition to the core deflection, include initial centering of the core mounting, actual relative dimensions of the core and cavity diameters, clearance of the shank of the core pin at the mounting and angle of the core pin axis (degree of perpendicularity of the core). All of these factors must total not more than 0.001 inches where a steel core pin is employed.

Another significant problem which contributes to the above-mentioned core deflection problem is adequate and symmetrically disposed venting. As the high pressure heated material is injected rapidly into the cavity space defined between the female cavity and the male mold core, air within the cavity space must be rapidly exhausted. Accordingly, vents are provided. Nevertheless, the vents must be of such size as to allow escape of air but to prevent or minimize flow of the plastic therethrough. Any flow of the plastic through the vent holes causes undesirable flash. Thus, venting passages sufficient to handle high rate of flow of the exhausting gases must be provided and yet the venting orifices communicating with the space within the cavity must be sufficiently small.

Balanced venting is an aspect that is of great importance in molding of thin wall articles. The venting must be precisely balanced about the cavity and about the core to ensure that venting of the gases does not take place more rapidly at one side of the core than the other. If the gas vents more rapidly at one side, that side will fill more rapidly. This may result in one side of the cavity, on one side of the core, containing high pressure liquid injected material before any balancing material has reached the other side of the core. Circumferentially unbalanced inflow of injected material will cause unacceptably large lateral and bending forces on the core and prevent the formation of an acceptable molded article.

Accordingly, it is an object of the present invention to enable molding of elongated, thin wall articles.

SUMMARY OF THE INVENTION

In carrying out principles of the present invention in accordance with a preferred embodiment thereof, the problem of core bending and positioning is handled by several different features, each of which is individually effective, and all of which contribute to a unitary result. The core is exceedingly rigid, having a very high modulus of elasticity, many times higher than that of steel. The core is mounted loosely, but is firmly and precisely positioned when the mold parts are in closed position. More specifically, the core and a core locking device have mutually engageable locking surface means to firmly grasp and position the core with respect to the mold parts when the mold parts are in closed position, whereas the core is relatively loosely held when the mold parts are opened. According to another feature of the invention, balanced, controlled venting of the cavity is provided. More specifically, a vent pin is provided within the core and cooperating therewith to define a plurality of separate symmetrically positioned vent orifices that pass venting gases to the interior of the core to be exhausted outside of the apparatus. Similar balanced venting is provided through the wall of the cavity.

DETAILED DESCRIPTION

Molded Article

Figure 1:
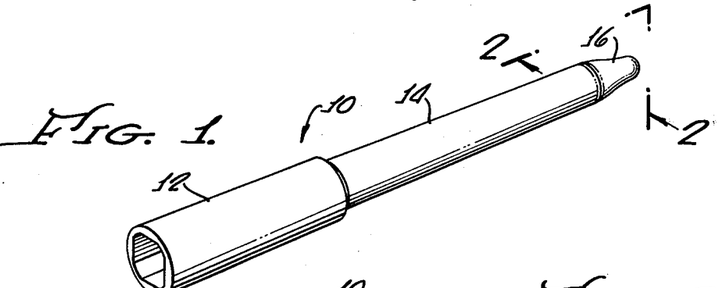
FIG. 1 is an enlarged perpective view of a thermometer probe cover manufactured by the apparatus of the present invention.

An example of the type of elongated thin wall integral article that is rapidly and inexpensively produced by the method and apparatus of the present invention is a thin wall tapered probe cover 10 illustrated in FIG. 1. The cover is preferably disposable, preferably to be used but a single time and then discarded rather than sterilized for subsequent use. Nevertheless, reuse of these covers is feasible. The cover is inserted over a tapered probe (not shown) of a digital electronic theremometer and then inserted into a body cavity, temperature is read digitally by circuitry and display of the electronic instrument, the probe and cover are withdrawn from the body cavity, the cover is removed and discarded, and the instrument is ready for application of another cover and another temperature reading.

Figure 2:
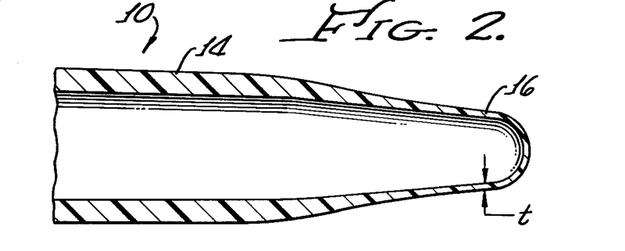
FIG. 2 is a sectional view, still further enlarged, taken on lines 2—2 of FIG. 1, and particularly illustrating the thin wall tip configuration of the article.

The probe cover body includes a relatively stiff and thick-walled base section 12, an intermediate section 14 of somewhat lesser wall thickness and a tip 16 of exceedingly small wall thickness. The very thin tip 16 increases the speed of the instrument in a temperature reading, since heat transfer through the material of the integral probe cover is dependent upon the thickness of the material covering the probe tip, which is positioned within the cover tip 16. The probe cover is hollow, being open at the base end and completely closed at its tip. All of the exterior must be smooth and free of flash or other irregularities. The thinner the tip the better the heat transfer and the greater the flexibility of the tip. Such flexibility allows the tip to stretch somewhat over the tip of the probe to provide a more intimate physical contact over a larger area of the probe and thus, still further enhance the heat transfer.

In practicing the present invention, according to a preferred embodiment, a probe cover injection molded of polyethelene plastic has a maximum diameter at its base section of about $\frac{3}{8}$ of an inch, a total length of about $3\frac{1}{8}$ inches, a wall thickness at its base section 12 of about 0.060 inches and a wall thickness at its intermediate section 14 of about 0.030 inches. The tip 16 has a nominal wall thickness $t$ of less than 0.020 inches and preferably 0.010 inches in this exemplary embodiment. Tolerance of the wall thickness of the tip is ±0.005 (five thousandths of an inch).

Molding Press

Figure 3:
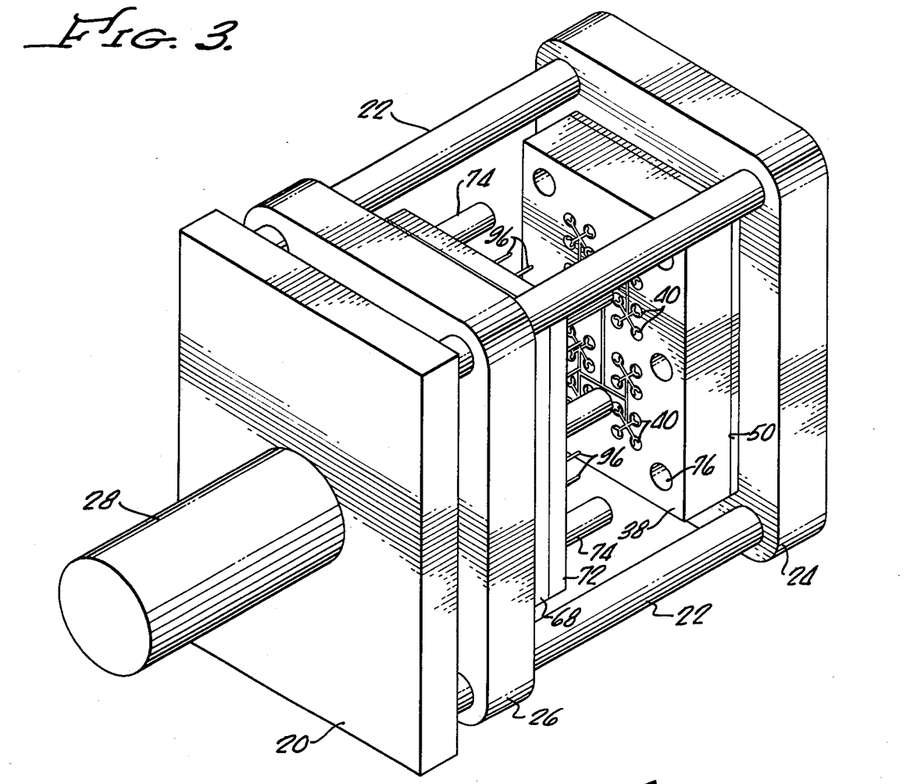
FIG. 3 is a simplified perspective view of basic components of a substantially conventional injection molding press employing mold parts for practicing the present invention.

To form probe covers of the type illustrated in FIGS. 1 and 2, a conventional injection molding press, with modified mold parts, is employed. As schematically illustrated in the drawings (FIGS. 3, 4), the molding press includes a fixed support 20 (mounted by suitable means, not shown) which is rigidly secured by tie bars 22 to a stionary platen 24 of the press. The press includes a moving platen 26 which is adapted to slide on the tie bars 22 when driven by an actuating means such as an hydraulic cylinder 28 having an associated driven piston rod 30 (FIG. 4) that extends slidably through the support 20.

It is to be understood that the present showing is only schematic and that the cylinder 28 may actually comprise a more complex toggle mechanism adapted to apply great pressures to the moving platen 26. The actuating means 28 is suitably controlled by molder control means illustrated in block form at 32 in FIG. 4. Further details of a molding machine of a type capable of performing the present invention (although modified for making probe covers with metallic inserts) are shown in U.S. Pat. No. 3,719,396 to Van De Walker et al.

Control means 32, like all of the control means schematically represented in the present application, preferably forms part of a unitary overall control circuit which makes the entire operation fully automatic so that the operator merely stands by the machine and watches for malfunction. Since such overall control circuit and mechanism form no part of the present invention and since the various control operations for the cylinder 28 and other portions of the apparatus may be preformed by hand (as by the operator's actuation of suitable valves and switches) no description of the overall controls circuit is provided.

The side of the press incorporating the stationary platen 24 is normally the "hot side of the press." Such "hot side" incorporates the feed hopper for the plastic, the heating means for the plastic, and the plastic extruder which forces hot plastic into the mold means to be described below. Referring to the right side of FIG. 4, a portion of the extruder and associated nozzle is represented at 34. These elements are associated with an injection control means represented in block form at 36, such means determining the amount of plastic which is injected and also determining the times of injection (preferably under control of the overall automatic control circuit indicated above).

Figures 4, 12, 13:
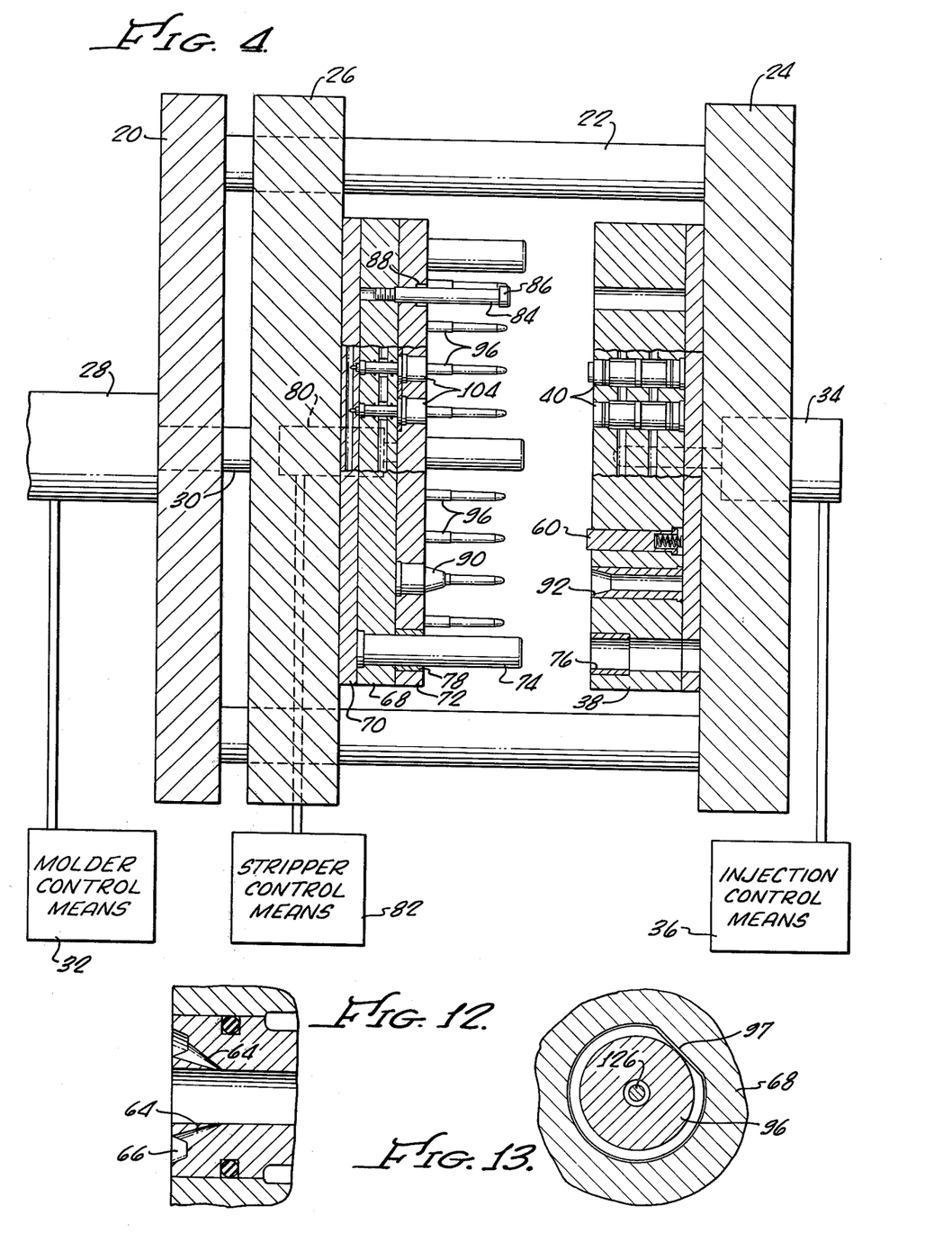
FIG. 4 is a sectional view of the press in open position taken on line 4—4 of FIG. 5, showing in block form certain controls.
FIG. 12 is a section taken on lines 12—12 of FIG. 5 showing the molding material injection gates.
FIG. 13 is a section taken on lines 13—13 of FIG. 6.

A first (female) mold part 38 is mounted to the stationary platen 24 and has fixedly mounted therein a plurality of mutually spaced and identical replaceable cavity forming bodies 40. The cavity forming bodies 40 define the mold cavities which are provided in the replaceable bodies of the female mold part for ease of manufacture. In an exemplary embodiment of the present invention, an injection molding press is made for simultaneously molding thirty two probe covers and accordingly, female mold part 38 is formed with thirty two identical cavity-forming bodies, positioned in the pattern illustrated in FIG. 5.

Figure 6:
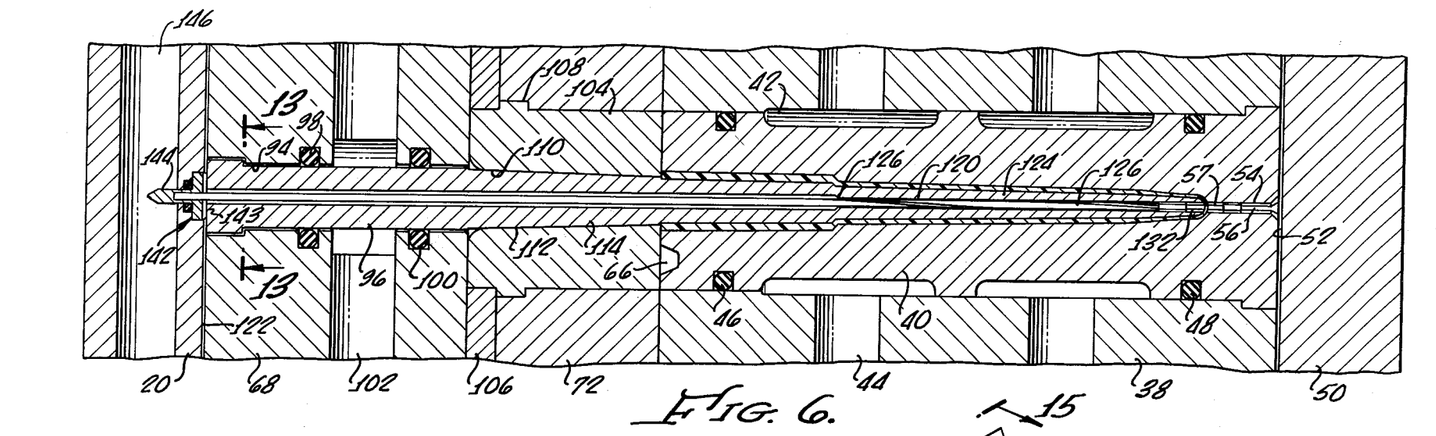
FIG. 6 is a greatly enlarged fragmentary sectional view of the mold parts in closed position, showing a single core and cavity.

Each mold cavity body 40 is formed with a mold cavity having an interior configuration that precisely defines the exterior configuration of the article to be formed. This is a tapered shape of which the cross-section varies from point to point. As best illustrated in FIG. 6, each body 40 is fixed to the female mold part 38 and has one or more circumferential channels 42 in communication with temperature controlling water passages 44 that are formed in the mold part 38. O-rings 46, 48 circumscribe each mold cavity body at opposite sides of the channel 42 to seal the body to and within the female mold part 38. Female mold part 38 includes a backplate 50 fixed thereto and defining together with the mold part 38 an air venting channel 52 that communicates with a cavity plate aperture 54 extending through the old cavity body 40 from the tip of the cavity formed therein. A cavity plate vent pin 56 (FIGS. 8 and 14) is mounted within the vent bore 54 to restrict the size of the cavity plate venting orifices thereby substantially eliminating flash. Details of vent pin 56 are set forth below and shown in FIGS. 14, 15. The orifices defined between bore 54 and the vent pin 56 must be small enough to eliminate flashing. Partly for this reason it is desirable to provide additional venting as will be described more particularly below.

Female mold part 38 also carries a plurality of spring pressed pins 60 (FIG. 4) which assist in parting the two mold parts when the mold pressure of the actuating means is released.

Figure 5:
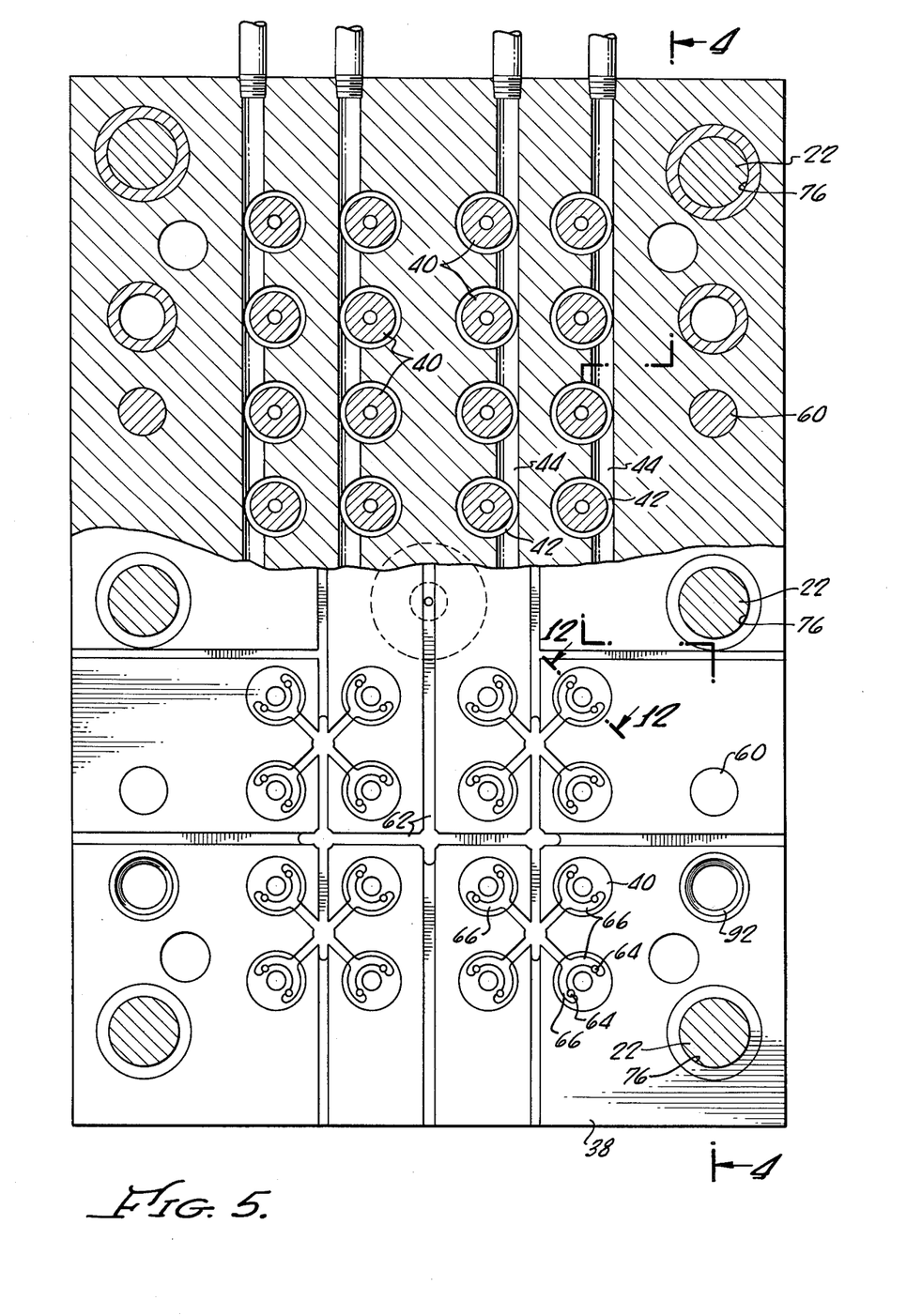
FIG. 5 is a face view, with parts broken away, of the female mold part.

Hot plastic injection material under high pressure is fed from the nozzle of extruder 34 to a runner system including runner channels 62 (FIG. 5) which communicate with gating means for each of the mold cavities. The gating means for each cavity, as best shown in FIGS. 5 and 12, comprises a pair of diametrically opposed angled gating orifices 64 connected to the runners 62 by a semi-circular runner 66 extending slighly more than 180° around each cavity. The gating for each of the thirty two cavities in this exemplary embodiment, together with the connecting runner system therefor, is carefully and precisely balanced to ensure balanced flow of injected molding material, a flow that is equal for each cavity and which is uniformly distributed about the circumference of each cavity. A significant factor affecting rate and balance of flow of the hot plastic as it enters the cavities from the dual gates is the cavity venting. Accordingly, unique and precisely controlled venting of the cavity is provided as more particularly described below.

The male mold part is mounted upon the movable platen 26 and includes a primary element 68 fixed to a movable back plate 70 and carrying a secondary element in the form of a shiftable stripper plate 72. Element 68 of the male mold part fixedly carries a plurality of leader pins 74 which are received in a plurality of bushings 76 of female mold part 38 as the two parts move toward closed position. Leader pins 74 also slidably extend through apertures 78 in the stripper plate and thus assist in guiding motion of the stripper plate to and from the primary element 68 of the male mold part.

Stripper plate 72 is operated between a retracted position (FIG. 4) and an extended position (an intermediate position being shown in FIG. 7) by means of one or more cylinders 80, shown schematically in FIG. 4 and carried by moving platen 26, under control of stripper control means 82. Motion of the stripper plate to extended position is also guided by headed stop pins 84 adjustably fixed to the primary element 68 of the male mold part and having enlarged heads 86 which are received in enlarged apertures 88 as the stripper plate reaches the limit of its extending or stripping motion.

Mounted in stripper plate 72 are a plurality of positioning pins 90 having truncated conical tips that mate with similar truncated conical recesses 92 formed in the female part 38. Pins 90 and recesses 92 ensure appropriate relative positioning of the stripper plate and female mold part 38 when the mold is in closed condition. Because of the unique mounting of cores carried by the male mold part, as will be more particularly described below, it is the relative positioning of stripper plate and female mold part, even more so than the relative positioning of male mold element 68 with respect to female mold part 38, that is critical in concentrically positioning core and cavity.

Core Mounting

Mounted as a relatively loose but close fit within a plurality of bores 94 formed in the primary male mold element 68 are the rearward ends of a plurality of cores 96 which are resiliently and shiftably retained in position within the bores 94 by O-rings 98, 100 (FIG. 6). The latter are positioned on either side of water conduits 102 to thereby also seal these conduits. The cores are angularly oriented about their longitudinal axes relative to the mold element 68 by mating flats 97 on the mold element and core shank (FIG. 13). Each core 98 is cantilevered from the male mold part and extends therefrom toward the female mold part, movable with the mold part from the position illustrated in FIG. 4 wherein the two mold parts are spaced from each other in open position, to the closed position of FIG. 6 wherein the cores are fully inserted into the cavities of the female mold part.

The cores, when inserted into the cavities, are completely free of contact with the cavity walls and completely independent of any support from such cavity walls. The cores are precisely and accurately positioned to be concentric with the respective cavities. This concentricity is of great importance. It is critical in the molding of thin walled parts, since any departure from such concentricity will cause the wall of the finished article to be thinner on one side than the other. In the injection molding of polyethelene, it is not considered feasible to attempt to cause the hot plastic to flow through passages of less less than 0.005 (five thousandths of an inch). Accordingly, when molding an article having a nominal wall thickness of 0.010 inches, departure from concentricity (assuming the impossible condition of all other factors being ideally perfect) cannot exceed 0.005 (five thousandths of an inch). As previously mentioned, other factors that affect wall thickness, particularly wall thickness of the tip of the molded article, are the relative sizes of the core and cavity, the clearance of the core shank at its cantilevered mounting in element 68, perpendicularity of the core and core deflection or bending. The problem of core deflection is handled in a manner to be more particularly described below. Other factors that affect the core positioning and thus the uniformity and magnitude of desired wall thickness of the tip are controlled by a unique core mounting.

Figures 7, 14, 15:
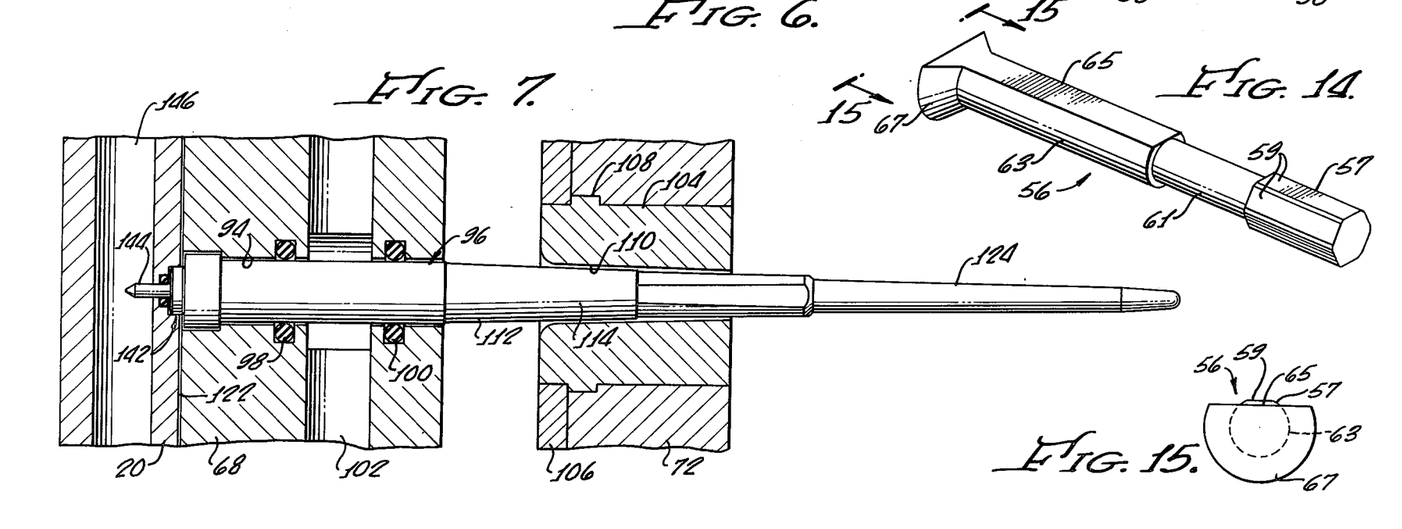
FIG. 7 is an enlarged fragmentary sectional view of the male mold parts, with the stripper ring in a displaced position.
FIG. 14 is a perspective view of a cavity vent pin.
FIG. 15 is a view taken on lines 15—15 of FIG. 14.
Figure 8:
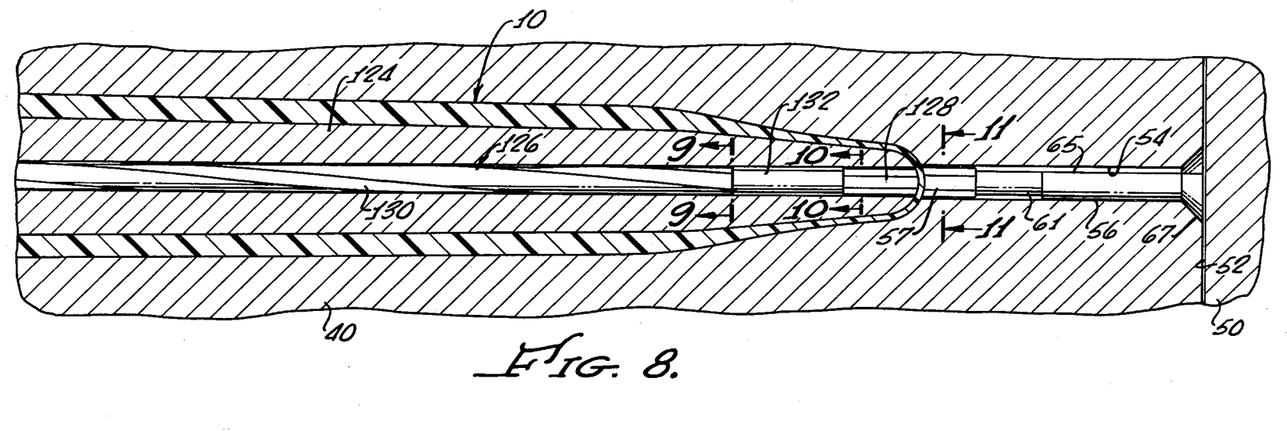
FIG. 8 is a fragmentary sectional view, still further enlarged, of the mold core and cavity with the mold material therebetween.

As previously indicated, the core shank is relatively loosely mounted to and cantilevered in the primary male mold element 68. Nevertheless, the core is precisely and firmly locked in position when the mold parts are closed. This positioning and locking of the core is provided by the second element of the male mold part, namely, the stripper plate which cooperates with a tapered locking section of the core to provide the required core positioning. To this end the stripper plate has mounted therein a plurality of core locking rings 104 that are retained in place by a plate 106 fixed to the stripper plate 72 and engaging collars 108 formed on each of the locking rings. Each locking ring 104 has a tapered bore 110 that precisely mates with a tapered outer surface 112 of a locking section 114 of a corresponding one of the cores 96. The cooperating tapered bore 110 and tapered surface 112 are constructed and arranged so that when the stripper plate 72 is spaced from the primary male mold element 68 (as shown in FIG. 7, for example) the core is only loosely retained within the locking ring 104 and, of course, is still relatively loosely and shiftably retained within the element 68 by means of the O-rings 98, 100. In addition, the relative configuration of the parts is such that when the mold parts are in closed condition (as shown in FIG. 6), the pressure exerted by actuator 28 presses primary male mold element 68 toward the female mold part with the stripper plate interposed therebetween. Accordingly, the core locking rings 104 are all forced toward the left relative to the cores and element 68 (as viewed in FIG. 6). Each core locking ring is then a slight press fit upon the tapered surface 112 of the locking section 114 of the core. With this arrangement, it becomes practical to build a mult-cavity mold having slender cantilevered cores precisely aligned, positioned and spaced during injection. Although such positioning of a single core upon a mold element may more easily be accomplished, it is more difficult, if not impossible, to retain and maintain such precise positioning, alignment and spacing in a multi-cavity mold. The difficulties are due to various factors including significant temperature differences from one part of the mold to the other. On the other hand, manufacture, location and alignment of the core locking rings 104 within the stripper plate 72 is a simpler task, capable of being formed with greater precision in a multi-cavity press than is the cantilevered mounting of the cores themselves. Further, positioning pins and recesses 90, 92 carried by the stripper plate and female mold part afford a greater positioning accuracy of the stripper plate with respect to the female mold part.

Another important result that flows from using the stripper for locking and positioning of the cores rather than the more rearwardly disposed primary male mold element 68, is the fact that the stripper plate is closest to the female mold part, wherefor the unsupported length of the core is minimized.

Core Material

Even with a nearly ideal positioning, dimensioning and concentricity of core and cavity, it may be difficult to maintain a suitably small, nominal wall thickness with cores of conventional construction. Steels, which are commonly employed in the manufacture of prior art cores, have a modulus of elasticity of approximately $31 \times 10^6$. Accordingly, for a core of the illustrated relative dimensions, the tip will readily deflect 0.004 inches (four thousandths of an inch) due to lateral forces imposed by normal inflow of hot plastic. Even with careful and precise control and balance of the injection gates and controlled venting of the cavity, deflection of a steel core is unacceptably large in the manufacture in such thin wall articles.

According to a feature of the present invention, this problem is handled by forming the core of a material previously considered to be unsuited for this application. Preferably, the core is formed of a material having a modulus of elasticity many times greater than that of steel, a modulus in the order of $100 \times 10^6$. In a preferred embodiment, the cores are formed of a mixture of 85% tungsten carbide and 15% cobalt, having an average hardness of 87 - 88 Rockwell "A," a tensile yield strength of 145 × $10^3$ psi and a modulus of elasticity of 79.5 × $10^6$ psi.

Cavity Venting

Having precisely locked and positioned the core, and having minimized its bending in the presence of lateral disturbing forces, two significant problems have been overcome in the manufacture of elongated thin wall injection molded articles. Nevertheless, even with such precise positioning and uniquely rigid cores, lateral disturbing forces may be sufficiently great to cause unacceptable core deflection. Such lateral forces may be caused indirectly by unbalanced and unevenly distributed venting of the annular cavity space, defined between the female mold part cavity and the core inserted therein. The hot plastic is injected rapidly under high pressure. In a typical operation, the plastic is heated to about 485° F. and injected under a pressure of about 10,800 lbs. per square inch (pressure in the runner system). The high pressure is held for about one and one-half seconds, the time required to substantially fill the annular mold cavity space and the hot plastic is then held at about the 7,000 per square inch for approximately seventeen seconds, the time required for the plastic to cure sufficiently for extraction.

During the one and one-half seconds of higher pressure fill time, air from the annular cavity space must be vented. If this air is vented more rapidly from one side of the annular cavity space than the other, the hot plastic will fill such side more rapidly than it will fill the other side, resulting in a differential bending pressure upon the core and possibly resulting in an unacceptable amount of core bending. Accordingly, not only must the injection gates be carefully balanced, but the venting of the cavity must be carefully balanced. Further, the venting must provide for sufficient rate of flow of the venting gases to allow the rapid cavity filling, and yet the venting orifices must be so small as to prevent or minimize flash. Flash is the plastic that escapes through venting or other apertures in the mold. It will be recalled that it is of the utmost importance, in a thermometer probe cover in particular, that the exterior of the article be entirely smooth and free of flash. Thus, the vent apertures must be of a sufficient size collectively to handle a high rate of exhausting gases and yet, individually, must be sufficiently small to prevent flashing. Further, the orifices must be carefully balanced to ensure evenly distributed venting.

Figure 11:
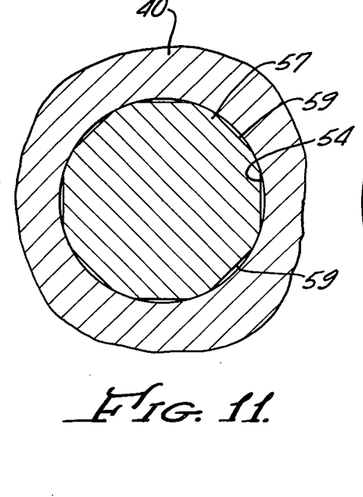

Because of the small size of the thermometer probe cover tip, it is found that the vent orifices defined between vent pin 56 and the bore 54 of the female mold part (FIG. 11) may not provide an adequate vent rate. Accordingly, additional venting is desired. Thus, another important feature of the invention involves precision control of venting through the core itself to supplement the venting via bore 54 of the cavity forming bodies 40. To this end, the core is formed with a passage or bore 120 extending throughout its entire length, receiving vent gases at the free end of the core, passing these through the core bore 120 and thence to a vent passage 122 (FIG. 6) formed between the back plate 20 of the male mold part and the primary mold element 68.

The tungsten carbide and cobalt core is formed upon a mandril of a pressed sintered powder. The core is formed in two sections, joined together. Two core sections are required to enable precision drilling of the core bore.

Figure 10:
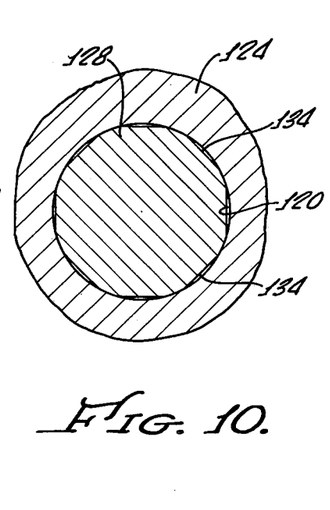

In order to provide a balanced and evenly distributed venting through the core bore 120 and further to ensure an adequate number of sufficiently small size vent orifices, a vent pin 126 (FIG. 8) of unique configuration is inserted within the bore of the core. The vent pin has a head 128 at the tip of the core, a main body portion or shank 130 and an intermediate reduced diameter or necked down portion 132. The head 128 is formed from a circular cylindrical section that is a close fit within the circular section of the core bore 120 at the tip of the core, but has machined thereon a plurality (eight in this embodiment) of flats 134 (FIG. 10). Accordingly, a plurality of relatively small vent orifices are defined between the interior surface of core bore 120 and the flats 134, respectively. This arrangement provides an even, symmetrical and completely balanced group of orifices of sufficient number and suitably small size, and yet affords a self-centering of the vent pin by virtue of the contact of the edges of the pin head 128 with the core bore. Venting area is maximized without flashing.

It is important to firmly locate the vent pin so that it cannot be laterally displaced during venting. If the pin head 128 is not concentrically positioned within the core bore 120, the venting gas may push the pin to one side and provide venting only on the other side of the pin. This, in turn, causes uneven fill rate on the two sides of the core and may result in unacceptably large lateral forces on the core. Further, the even distribution of the vent orifices and the relatively large number of such orifices, cause the vents to load up more slowly, that is, they will operate for longer periods free of obstructing plastic.

Figure 9:
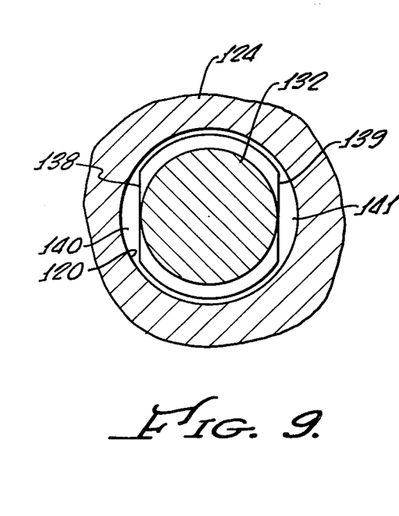
FIGS. 9, 10 and 11 are sectional views taken on lines 9—9, 10—10 and 11—11 respectively, of FIG. 8.

Shank 130 of vent pin 126 is formed with one or more spiral flats 138, 139 (FIG. 9) that provide vent passages 140, 141 between the flat and the interior of the bore 120. Shank 130 is a close fit within the core bore to ensure proper centering. The flats 138, 139 make at least one full turn around the vent pin in order to minimize unbalance due to lateral forces of the gas vented through the core bore.

To provide communication between the eight orifices defined between bore 120 and the flats 134 on the head 128 of the vent pin, and the passages 140, 141 defined in part by the spiral flats 138, 139, there is provided the intermediate necked down portion 132 that defines an annular manifold completely circumscribing the necked down portion 132 between the vent pin and the bore 120.

VENT PIN COOLING

To provide for cooling of vent pin 126, the rearward end thereof (on the left side as viewed in FIG. 6) is inserted into a recess formed in a substantially T-shaped heat sink 142 having a leg 144 that extends into a cooling water passage 146 formed in backplate 20. The head of heat sink 142 is formed with a diametral slot 143 that connects core bore 120 with vent passage 122. Cooling of the vent pin decreases the relatively high exhaust gas temperature and therefore causes less corrosion. Portions of the gas vented at the end of the fill are exhausted at exceedingly high velocities through the small orifices, creating higher temperatures and could result in burning of the plastic at the probe cover tip without adequate cooling of the core vent pin. Venting of the annular cavity space through the core pin avoids the need for additional venting orifices through the cavity plate and therefore, still further minimizes flash and other irregularities on the exterior surface of the finished article.

Cavity Vent Pin

Cavity vent pin 56 (FIG. 14) includes a head 57, a necked down intermediate portion 61, and an end section 63 having a flat 65 extending to an outwardly flared vent pin end 67 in communication with the vent passage 52 formed in back plate 50. Head 57, like head 128 of the core vent pin, is formed with a plurality of flats 59 that cooperate with cavity vent bore 54 to define a number (either in a preferred embodiment) of small orifices that are evenly distributed about the circumference of the cavity vent bore. These orifices are coupled to the vent passage formed by bore 54 and flat 65 by means of the annular manifold defined between necked down pin portion 61 and bore 54.

Figure 16:
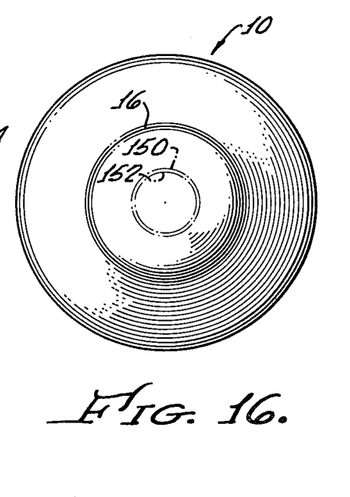
FIG. 16 is an end view of the exterior of the tip of the probe cover of FIGS. 1 and 2.

It will be noted that there are two basic sets of vents, each set defining a marking pattern comprising a circular array. The first set is that providing venting via the bore 54 in the cavity forming body 40, around the head 57 of cavity pin 56. The second set is that provided by the core bore around the head 128 of the vent pin 126. The venting through bore 54 defines an array in a somewhat larger circle than the array in the core. The arrays have a predetermined relative position and form indicia on inner and outer surfaces of the article of corresponding configurations of predetermined relative position. This feature enables visual inspection of the quality of the finished article insofar as balance of the wall thickness of the thin tip is concerned. Thus, as illustrated in FIG. 16, looking at the outside of the probe cover tip (the tip is somewhat transparent because of its small wall thickness) one sees a pair of substantially concentric circles 150, 152, for a perfectly balanced article having a uniform wall thickness around the circumference of its tip. The larger circle 150 (on the outside) results from the venting in bore 54, whereas the smaller circle 152 is on the inside of the probe cover and results from the array of orifices defined by the core and core vent pin. If these two circles are seen to be substantially concentric, as illustrated in FIG. 16, it is known that the array of orifices in the core was substantially concentric with the array of orifices in the cavity body when the article was formed. Thus, it is known that properly balanced circumferentially uniform wall thickness has been achieved. On the other hand, if the two circles are seen to be radially displaced relative to one another, then the magnitude of such relative radial displacement provides a direct indication of departure of wall thickness from the desired uniformity, and may be employed as a measure of acceptability of the finished articles upon inspection. Visibility of the two circles is enhanced by lighting the inside of the cover while viewing the outside of the tip of the cover. It will be readily appreciated that this visual inspection can be made available by use of other patterns and other types of marking to indicate concentricity. Nevertheless, the circular array of orifices is desirable for venting and inherently enables visual inspection.

Operation

In operation of the described molding press, the parts are initially in a position substantially as illustrated in FIG. 4. The stripper plate 72 has been driven to the left (against male mold element 68) by operation of hydraulic motor 80. The core pins are now snugly retained within the stripper rings 104 but do not have the necessary locking and press fit therein because the force exerted by motor 80 is not sufficient for this purpose. Control means 32 is actuated to cause the hydraulic motor 28 and the piston rod 30 to drive the movable plate 26 together with the male mold part and the stripper plate to the right as viewed in FIG. 4, toward the mold closed position. Leader pins 74 enter the mating bushings 76 of the female mold part first, then the core pins begin to enter the cavities. Further motion of the movable platen 26 causes positioning pins 90 to begin to enter tapered recesses 92 and stripper plate 72 approaches a position of contact with the female mold part 38. The primary male mold element 68 continues toward its final position as shown in FIG. 6 and presses the stripper plate 72 firmly against the male mold part. As the primary mold element 68 attains its final mold closed position under the relatively high driving force of motor 28, positioning pins 90 are firmly pressed into recesses 92 and the stripper plate is strongly pressed between the primary mold element 68 and the female mold part 38. This final increment of closing motion of the primary mold element 68 (the cores up to this point have been snugly positioned, but not a press fit within the stripper rings 104) drives the tapered locking sections of the cores into the tapered bores 110 of the stripper rings 104, thereby laterally shifting the cores (as may be necessary) to press the cores into the rings in a tight, locking press fit. Thus, the cores are precisely positioned and aligned under the driving force of the motor 28. With the cores a press fit within the stripper rings 104, they are firmly locked in position and the mold is now ready to receive the hot liquid material.

Hot plastic is now injected through the dual gates of each cavity, flowing along the annular cavity space toward the tip of the cavity. As the hot plastic enters the annular cavity space, the gas confined therein is vented through the venting orifices previously described. Water at a temperature of 150° F. is caused to flow through the passages 44 and 102, through and around the cavity forming bodies 40 of the female mold part and around the core shank in the primary male mold element. However, in order to cool the core vent pin 126, the cooling water in passage 146 is maintained at about 75° F. As previously indicated, the high pressure fill takes less than two seconds and the material is held at a lower 7000 psi pressure for approximately 17 seconds, until cured. As it cures, the injected material shrinks and pulls away from the sides of the cavity and adheres to the core. Therefore, as the mold parts are opened the core is withdrawn from the cavity with the cured molded part adhering thereto. After complete withdrawal to a position such as that illustrated in FIG. 4, stripper control means 82 is operated to press the stripper plate 72 forwardly toward the position illustrated in FIG. 7, and beyond such position to a point where all of the molded articles, all interconnected by plastic that cured in the runner system, may fall downwardly between the opened mold parts. The stripper plate is then retracted to the position illustrated in FIG. 4. Now the apparatus is ready for another cycle.

It will be readily seen that the loose mounting of the cores and the core positioning or stabilization of the core and cavity concentricity that is afforded by the stripper rings is a significant improvement over prior systems wherein both the relatively movable stripper plate and the rearwardly positioned primary mold element operate to tightly grasp and center the core.

Where two relatively movable elements are employed to tightly grasp the core, the two elements themselves must be precisely positioned with respect to one another. Thus, if a core were fixedly mounted in the mold element 68, any slight misalignment of the stripper plate would tend to shift the core position and destroy concentricity. So, too, the repetitive sliding motion of stripper plate and core would tend to provide wear and again vary the concentricity. Problems such as these are minimized by the floating mounting of the core within the male mold element and the fixed positioning that occurs upon the complete closing of the mold parts.

There have been described methods and apparatus for molding elongated thin walled articles wherein a unique group of novel features all cooperate with one another to maintain a precise concentricity of core and cavity. A novel floating core mounting and a press fit stripper ring positioning of the core upon mold closing cooperate with a core formed of a material having an exceedingly high modulus of elasticity to ensure proper positioning and to minimize core bending. Core bending is further minimized by precision control of cavity venting, achieved through the use of unique vent pin configurations.

The foregoing detailed description is to be clearly understood as given by way of illustration and example only, the spirit and scope of this invention being limited solely by the appended claims.

We claim:

1. Apparatus for molding elongated thin wall articles comprising
    a first mold part having a cavity formed therein with a length several times greater than its maximum cross-sectional dimension,
    a second mold part movably connected to said first mold part,
    means operatively associated with said mold parts for moving said first and second mold parts between mold open and mold closed positions, and
    an elongated rigid core mounted at one end thereof in said second mole part and movable therewith from said mold open position wherein the said core is withdrawn from said cavity, to said mold closed position wherein said core is symmetrically positioned within said cavity to define therewith a thin elongated annular cavity space for reception of injected molding material, said core having a length several times greater than its maximum cross-sectional dimension and being supported by said second mold part independently of the mold cavity when said mold parts are in closed position, said second mold part including first and second relatively movable and mutually connected elements,
    means operatively associated with said second mold part for relatively loosely mounting said core in said first and second elements when said mold parts are in open position, and
    means operatively associated with one of said elements for rigidly securing and positioning said core with respect to said second element and said second mold part when said mold parts move to said mold closed position.

2. The apparatus of claim 1 wherein said second element of said second mold part includes a stripper ring movably mounted with respect to said first element of said second mold part, said stripper ring and said core having mutually cooperating surfaces constructed and arranged to permit motion of said core relative to said mold parts when said first and second elements of the second mold part are in a first relative position and to securely grasp and position said core with respect to said second mold part when the mold parts are in said closed position and when said first and second elements of said second mold part are in a second relative position with respect to each other.

3. The apparatus of claim 1 wherein said second mold part includes a movable mold element and a stripper ring movably mounted with respect to said element, said core being relatively loosely mounted in said movable element, said stripper ring having a bore circumscribing said core and being movable relative to said movable element and relative to said core when said mold parts are in open position to thereby strip a molded article from said core, said stripper ring and core having mutually engageable locking surface means for firmly grasping and positioning said core with respect to said mold parts and stripper ring when said mold parts are in said closed position.

4. The apparatus of claim 3 wherein said mutually engageable locking surface means comprise a tapered outer surface formed on a section of said core and a mating tapered bore formed in said stripper ring, said stripper ring being positioned with respect to said core and movable mold element to cause said bore to be a press fit upon said tapered surface of said core section when said mold parts are in closed position.

5. The apparatus of claim 4 wherein the relatively loose mounting of said core comprises an aperture formed in said movable mold element loosely receiving an end of said core, and resilient means within said aperture.

6. Apparatus for molding elongated thin wall articles comprising
    a first mold part having a cavity formed therein with a length several times greater than its maximum cross-sectional dimension, a second mold part movably connected to said first mold part,
    means operatively associated with said mold parts for moving said first and second mold parts between mold open and mold closed positions, an elongated rigid core mounted at one end thereof in said second mold part and movable therewith from said mold open position wherein the said core is withdrawn from said cavity, to said mold closed position wherein said core is symmetrically positioned within said cavity to define therewith a thin elongated annular cavity space for reception of injected molding material, said core having a length several times greater than its maximum cross-sectional dimension and being supported by said second mold part independently of the mold cavity when said mold parts are in closed position, means for venting said elongated annular mold cavity space through said core comprising
        a core bore extending longitudinally through said core and having a vent aperture at the free end of said core,
        a core vent pin positioned in said core bore and having an end cooperating with said vent aperture to define orifice means symmetrically positioned about said vent aperture for passing gas from said elongated annular cavity space to the core bore, said core pin having a generally cylindrical cross-section with a maximum dimension substantially equal to the interior diameter of said vent aperture in said core, said generally cylindrical cross-section having a plurality of flat surfaces each cooperating with the wall of said core bore to define an individual vent orifice, said core pin further including manifold means for providing a vent manifold in communication with said orifice means, and means for providing a vent conduit between said core pin and said core bore from said manifold means toward a fixed end of said core, said manifold means comprising a section of said core pin immediately adjacent said orifice means, said core pin section having a relatively decreased diameter, said means for providing a vent conduit between said core pin and said core bore comprising a flat formed on the surface of said core pin between said section of decreased diameter and another portion of said core pin that is more remote from said orifice means than is said section of decreased diameter, said vent conduit flat extending in a spiral path.

7. In apparatus for injection molding elongated thin wall articles having a female mold part defining a mold cavity with a length several times greater than its maximum cross-sectional dimension and having a male mold part movably mounted to the female mold part and carrying an elongated relatively small diameter core adapted to be positioned within said mold cavity to cooperate therewith and define a long thin annular cavity for reception of injected molded material, said core having a length several times greater than its maximum cross-sectional dimension and a diameter at portions therof that is slightly less than the diameter of the cavity at corresponding portions so as to define a long thin annular cavity, the improvement comprising means operatively associated with said male mold part for cantilevering said core from said male mold part to support said core solely by said male mold part independently of said mold cavity, said core being formed of a material having a high modulus of elasticity whereby the core will have a decreased magnitude of bending deflection in the presence of lateral forces of pressurized material being injected even though the core is supported solely from the male mold part during the injection, said male mold part including a first movable element mounted for motion relative to said female mold part, and including means operatively associated with said male mold part for relatively loosely mounting said core to said first movable element, and means operatively associated with said first movable element and movable relative thereto for selectively fixedly positioning said core relative to said first movable mold element when said mold parts are in closed position and for loosely retaining said core when said mold parts are in open position.

8. The apparatus of claim 7 wherein said means for fixedly positioning said core comprises a stripper ring interposed between said first movable mold element and said female mold part, said stripper ring inlcuding means responsive to motion of the ring toward said first movable mold element to securely grasp and position said core.

9. The apparatus of claim 8 including means for venting said annular cavity through said female mold part and through said core.

10. The apparatus of claim 9 wherein said means for venting includes a bore in said core forming a vent aperture and a vent pin in said bore dividing said vent aperture into a plurality of spaced smaller apertures.

11. In apparatus for molding elongated thin wall articles, said apparatus having a cavity in one mold part and an elongated core secured to a second mold part and having a free end, said core and cavity defining an elongated annular cavity space for receiving injected material, the improvement wherein said core comprises an elongated body having a core bore extending longitudinally through said core and having a vent aperture at the free end of said core, a vent pin positioned in said core bore and having an end cooperating with said vent aperture to define orifice means symmetrically positioned about said vent aperture for passing gas from said elongated annular cavity space to the core bore, said pin having a generally cylindrical cross-section with a maximum dimension substantially equal to the interior diameter of said vent aperture in said core end, said cylindrical cross section having a plurality of flat surfaces each cooperating with the wall of said core aperture to define an individual vent orifice, said core pin including manifold means for providing a vent manifold in communication with said orifice means, said manifold means comprising a section of said core pin immediately adjacent said orifice means, said core pin section having a relatively decreased diameter, means for providing a vent conduit between said core pin and said core bore from said manifold means away from said free end of said core, said means for providing a vent conduit between the core pin and the core bore comprising a flat formed on the surface of said core pin between said section of decreased diameter and another portion of said pin that is more remote from said orifice means than is said section of decreased diameter, said vent conduit flat extending in a spiral path.

12. In apparatus for injection molding elongated thin wall articles having a female mold part defining a mold cavity and having a male mold part carrying an elongated relatively small diameter core adapted to be positioned within said mold cavity to cooperate therewith and define an elongated thin annular cavity space for reception of injected molding material, said male mold part including a first movable mold element movably connected for motion relative to said female mold part, the improvement comprising means operatively associated with said male mold part for relatively loosely mounting said core to said first movable mold element, and means movable relative to said first movable mold element for selectively fixedly positioning said core relative to said first movable mold element, said last mentioned means comprising a stripper ring interposted between said first movable mold element and said female mold part and loosely retaining said core when said mold parts are moved away from each other, said stripper ring including means responsive to motion of the ring toward said first movable mold element to securely grasp and position said core.

13. The apparatus of claim 12 wherein said means to grasp and position said core comprises a tapered outer surface formed on a section of said core and a mating tapered bore formed in said stripper ring, said stripper ring being positioned with respect to said core and movable mold element to cause said bore to be a press fit upon said tapered surface of said core section when said mold parts are in closed position.

14. Apparatus for molding elongated thin wall articles comprising, a first mold part having a cavity formed therein having a length several times greater than its maximum cross-sectional dimension, a second mold part movably connected to said first mold part, means operatively associated with said mold parts for moving said first and second mold parts between mold open and mold closed positions, an elongated rigid core mounted at one end thereof in said second mold part and movable therewith from said mole open position wherein said core is withdrawn from said cavity, to said mold closed position wherein said core is symmetrically positioned within said cavity to define therewith an elongated annular cavity space for reception of injected molding material, said annular cavity space having at least a portion with a thickness of less than 0.060 inches, said core being formed of a material having a high modulus of elasticity, said core having a length several times greater than its cross-sectional dimension and being cantilevered to said second mold part and supported thereby independently of and free of contact with the mold cavity and said first mold part when said mold parts are in closed position, to thereby provide an unobstructed and continuous cavity around the sides and the other end of said core, said second mold part including first and second relatively movable elements, means operatively associated with said second mold part for relatively loosely mounting said core at said one end thereof to said first element for motion with said first element relative to said first mold part, said second element including means responsive to movement of said mold parts to mold closed position for firmly and precisely positioning said core and responsive to movement of said mold parts to mold open position for releasing such firm and precise positioning of the core.

* * * * *